United States Patent [19]

Landoll

[11] 4,125,198
[45] Nov. 14, 1978

[54] TRAILER HAVING SHIFTABLE UNDERCARRIAGE

[75] Inventor: Donald R. Landoll, Marysville, Kans.

[73] Assignee: Landoll Corporation, Marysville, Kans.

[21] Appl. No.: 795,640

[22] Filed: May 10, 1977

[51] Int. Cl.² .................................................. B60P 1/04
[52] U.S. Cl. ...................................... 214/506; 280/43; 280/43.23; 280/80 B
[58] Field of Search ............... 214/506; 280/43, 43.17, 280/43.23, 80 B, 438 R

[56] References Cited

U.S. PATENT DOCUMENTS

| | | | |
|---|---|---|---|
| 2,753,064 | 7/1956 | Lesser | 214/506 |
| 3,981,408 | 9/1976 | Chisum | 214/506 |
| 4,026,429 | 5/1977 | Rummell | 280/438 R X |

Primary Examiner—Robert G. Sheridan
Attorney, Agent, or Firm—Schmidt, Johnson, Hovey & Williams

[57] ABSTRACT

A trailer having a tiltable bed and a wheel-supported undercarriage is provided with structure mounting the undercarriage for reciprocal movement fore and aft of the bed between a forward, bed-tilting position and a rearmost, roading position wherein the bed is carried lower to the ground to accommodate higher loads. The mounting structure includes a pair of tracks on the bed and a series of ramps for raising the bed relative to the undercarriage when the latter is shifted from its roading position such that sufficient spacing between the bed and the undercarriage is provided for clearance of the bed understructure during movement of the undercarriage along its fore and aft path of travel.

3 Claims, 12 Drawing Figures

TRAILER HAVING SHIFTABLE UNDERCARRIAGE

This invention relates to transport trailers in general and particularly concerns a trailer adapted to load and transport large specialized vehicles such as farm tractors, combines, and other agricultural machinery.

The significantly increased size of modern agricultural machinery has presented ponderous transportation problems to manufacturers and dealers of this type of equipment. The massive size of many of the new agricultural machines makes them very difficult to load on a transport vehicle and further, many of these machines present a "tall profile" such that they must be transported on extremely low profile vehicles in order to avoid overhead interference with underpasses, bridges and tunnels of conventional roadways.

In an effort to overcome the high clearance problem described above, transporters of agricultural machinery have employed conventional "lowboy" flatbed trailers which typically have a low slung body section spaced forwardly of the rear wheels. One problem with the use of such trailers is that they are very difficult to load and unload inasmuch as the low slung body section presents a depression which requires careful placement and removal of the load carried therein. Even the low profile flatbed trailers which do not have a low slung central section are difficult to load and unload. In this connection, a convertible ramp means of some sort is normally used in conjunction with these trailers to load and unload them from the rear end. These ramps are of necessity relatively short, and as a result, the loading angle presented by the ramp is steep and difficult to negotiate.

One approach to overcoming the above mentioned loading problems is to tilt the entire bed of the trailer for providing a loading "ramp" with a relatively gradual incline. In order to present an optimum loading angle as well as to evenly distribute the load carried by the trailer, it has been found desirable to mount the wheels for such trailers in a manner permitting selective fore and aft shifting movement of the wheels relative to the trailer bed. By this arrangement, the wheels may be shifted forwardly on the bed to permit tilting of the latter to a desired gradual loading angle, while the wheels may be shifted rearwardly after loading of the bed to provide even weight distribution of the load between the trailer wheels and the wheels of the draft vehicle.

Although the trailers having wheels shiftably mounted on their beds are well suited for providing loading ease and proper weight distribution, these trailers are not able to accommodate extremely tall loads. In this regard, the wheels and supporting undercarriage must be spaced a distance from the bed sufficient to provide clearance of the bed understructure when the wheels are shifted relative to the bed. Thus, the bed is spaced further from the wheels (and hence further from the ground) than in conventional trailers where the wheels may be permanently mounted within the understructure of the bed itself. Manifestly, if the bed is spaced further from the ground it has a lower capacity for carrying tall loads over limited clearance roadways.

Accordingly, it is an important object of my invention to provide a device capable of overcoming the loading and the tall load problems discussed hereinabove.

It is a further important object of the instant invention to provide a trailer capable of presenting a small loading angle while at the same time having the ability to assume a low profile for transport of tall loads.

As a corollary to the foregoing object, it is another important object of the present invention to provide a trailer having a bed which is shifted upwardly relative to its wheel supporting undercarriage when the latter is moved from a normal roading position wherein the bed is supported low-to-the-ground.

Figure 1:
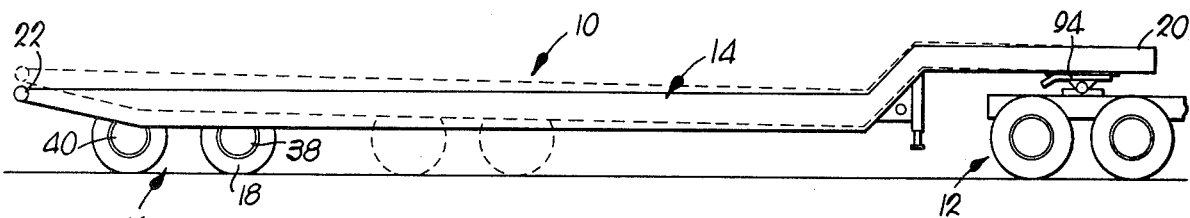
FIG. 1 is a side-elevational view of a trailer having shiftable undercarriage constructed in accordance with my invention shown coupled to a draft vehicle (only partially shown) and illustrating in broken lines a raised position of the bed relative to the undercarriage.

A trailer 10 is shown in a roading position in FIG. 1 coupled behind a draft vehicle 12 (only partially shown). The trailer 10 includes an elongate flatbed 14 and an undercarriage 16 having a plurality of ground-engaging wheels 18 for supporting the bed 14 in a normally horizontal disposition.

Figure 3:
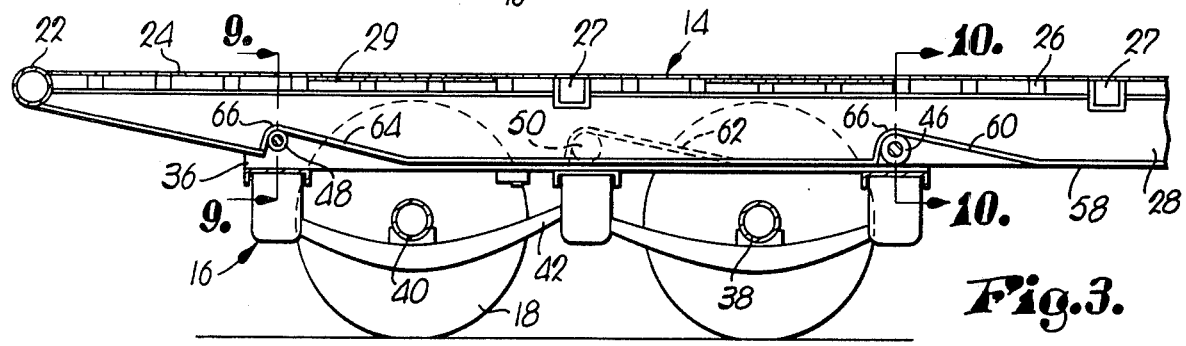
FIG. 3 is an enlarged, fragmentary, longitudinal cross-sectional view of the rear end of the trailer with the undercarriage positioned in its rearmost roading position.
Figure 4:
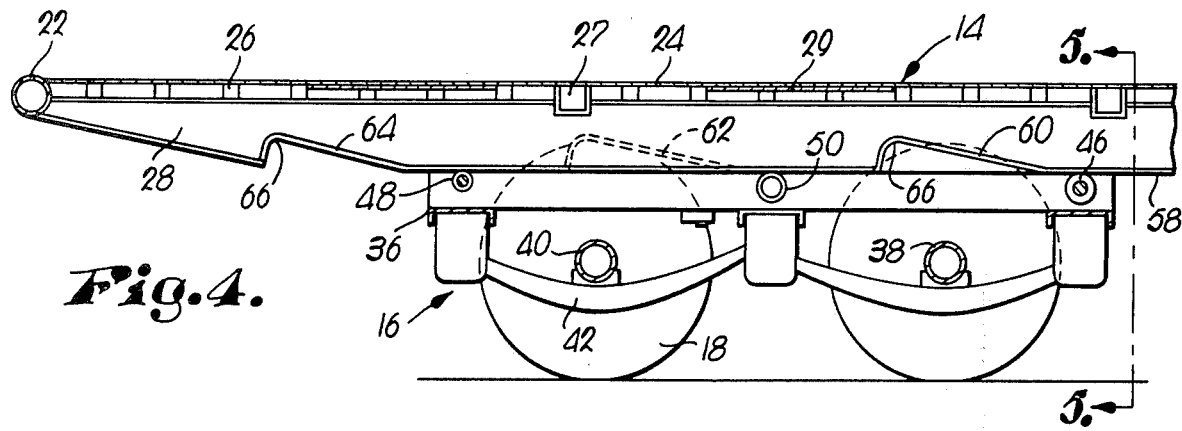
FIG. 4 is an enlarged, fragmentary, longitudinal cross-sectional view of the trailer showing the undercarriage shifted slightly forwardly of its roading position.
Figure 6:
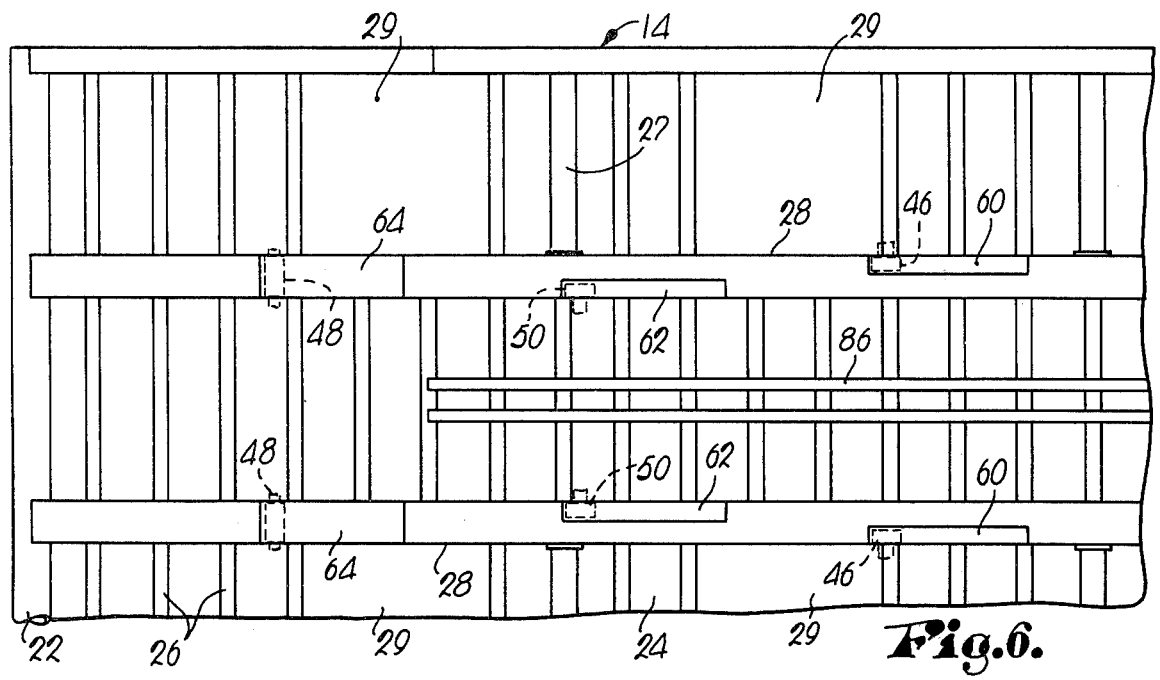
FIG. 6 is an enlarged, fragmentary, bottom plan view having portions broken away for clarity.
Figure 7:
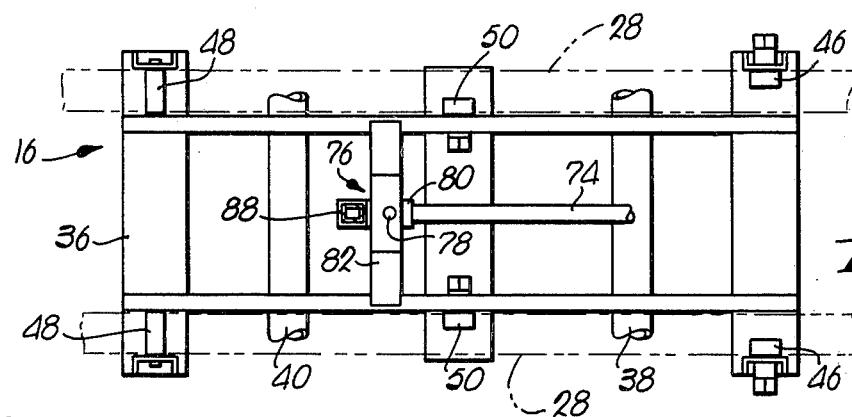
FIG. 7 is an enlarged, fragmentary, cross-sectional view taken in a horizontal plane immediately below the bed and showing details of construction of the supporting structure for the undercarriage.

The bed 14 includes a front end 20, a rear end 22, and an upwardly facing deck 24 extending between the ends 20, 22. The deck 24 is supported by understructure which includes a plurality of spaced, transversely extending cross beams 26, a pair of parallel, fore and aft extending I-beams 28, and a plurality of lateral support members 27 extending transversely from each I-beam 28 to respective longitudinal boundaries of the deck 24. As shown in FIG. 3, when the bed 14 is in the roading position, members 27 are at an elevation lower than the tops of wheels 18. As shown in FIG. 6, a number of plates 29 are arranged on the underside of deck 24 to be disposed above each wheel 18 when the undercarriage 16 is in the roading position.

The I-beams 28 also form a part of the structure which supports the undercarriage 16 to the bed 14 as described hereinbelow. Each I-beam 28 includes an upper flange 30 in engagement with the cross beams 26, a parallel lower flange 32 spaced below the flange 30 and a web 34 extending between the flanges 30,32.

The undercarriage 16 includes a main frame 36 and front and rear axles 38 and 40 respectively supported on the frame 36 in parallel, laterally spaced relationship by a number of leaf springs 42. Each axle 38, 40 rotatably supports two pairs of wheels 18 in spaced relationship on opposite sides of the frame 36.

The undercarriage 16 is mounted on the bed 14 by structure including a pair of roller assemblies 44 each in tracking engagement with a respective I-beam 28 for fore and aft reciprocation relative to the bed 14 between a roading position shown in solid lines in FIG. 1 and a bed-tilting position shown in broken lines in the same Fig. Each roller assembly 44 has a front roller 46 mounted on the forward end of the frame 36, a rear roller 48 at the aft end of the frame 36, and an intermediate roller 50 on the frame 36 between the rollers 46, 48.

Figure 11:
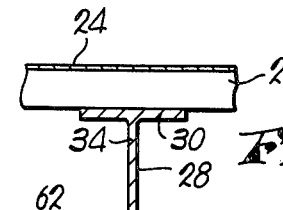
FIG. 11 is an enlarged, fragmentary, transverse cross-sectional view showing the rear roller transversing the intermediate recess.
Figure 12:
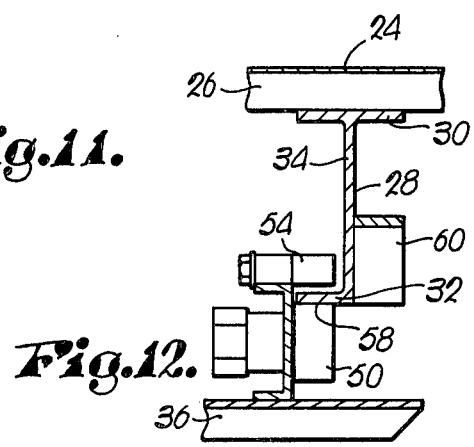
FIG. 12 is an enlarged, fragmentary, transverse, cross-sectional view showing the intermediate roller traversing the front recess.
Figure 10:
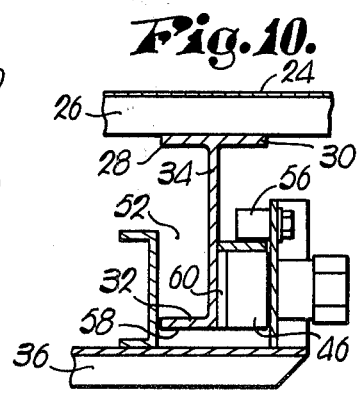
FIG. 10 is a further enlarged, fragmentary, cross-sectional view taken along line 10—10 of FIG. 3.

As shown for example in FIGS. 10 - 12, the rollers 48 and 46 of each assembly 44 are supported within respective channels 52 defined by the frame 36. Additionally, it may be seen that each roller 46, 48 and 50 is rotatably mounted on the frame 36 for rotation about axes extending transversely of the undercarriage 16. As shown in FIGS. 10 and 12, the rollers 46,50 each have cooperating retainers 54 and 56 respectively mounted in spaced relationship thereabove for augmenting the tracking engagement of the roller assembly 44 with its respective I-beam 28.

The lower flange 32 of each I-beam 28 is adapted to be received within a respective channel 52 as shown for example in FIG. 11. The flanges 32 each present a downwardly facing tracking surface 58 for engagement with the rollers 46, 48, and 50. Again referring to FIGS. 10 12, it may be seen that the front roller 46 is disposed to one side of the web 34 of beam 28 whereas the intermediate roller 50 is disposed on the opposite side of the web 34 and the rear roller 48 is centered relative to the web 34. It should be further noted that with the I-beams 28 received within the respective channels 52, the carriage 16 will be disposed in such a manner that the axles 38,40 extend transversely of the elongate axes of the bed 14.

While the tracking surface 58 extends parallel to the bed 14 along almost its full width, there is provided further structure in the form of forward, intermediate and rear ramps 60, 62 and 64 respectively inclined upwardly and rearwardly from the tracking surface 58 to effect upward movement of the bed 14 relative to the undercarriage 16 when the latter is shifted from the roading position as shown for example in FIG. 3.

Each of the ramps 60, 62 and 64 has a seat 66 for receiving respective rollers 46, 50 and 48 to preclude further rearward movement of the carriage 16 relative to the bed 14. An important feature of the present invention is the arrangement of the ramps 60, 62 and 64 on beams 28 and their relationship to the rollers 46, 48 and 50. In this regard, note that the forward ramp 60 is disposed on one side of the web 34, the intermediate ramp 62 is disposed on the opposite side of the web 34, and the rear ramp 64 traverses the full width of the lower flange 32. Thus, the forward ramp 60 is positioned to receive the front roller 46, the intermediate ramp 62 is positioned to receive the intermediate roller 50, and the rear ramp 64 is positioned to receive the rear roller 48. By this arrangement, the rear roller 48 is precluded from engaging either the forward or intermediate ramps 62 and the intermediate roller 50 is precluded from engaging the forward ramp 60, such that each of the rollers 46, 48 and 50 can engage only a respective one of the ramps 60, 62 and 64.

Figure 9:
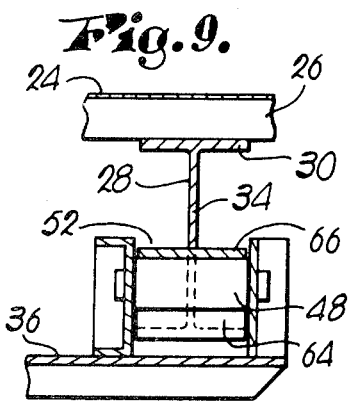
FIG. 9 is a further enlarged, fragmentary cross-sectional view taken along line 9—9 of FIG. 3.
Figure 5:
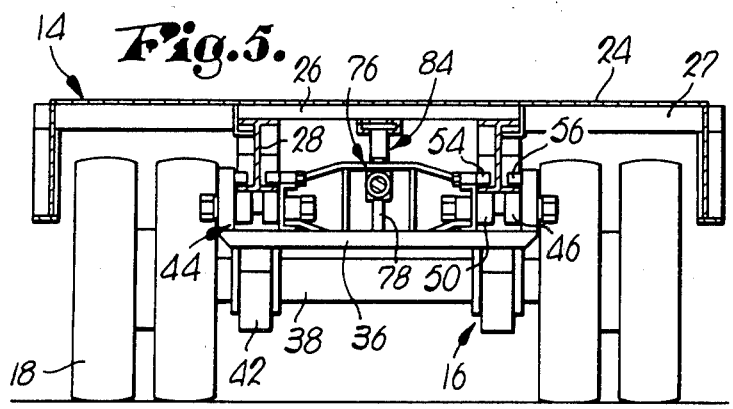
FIG. 5 is an enlarged, cross-sectional view taken along line 5—5 of FIG. 4.
Figure 8:
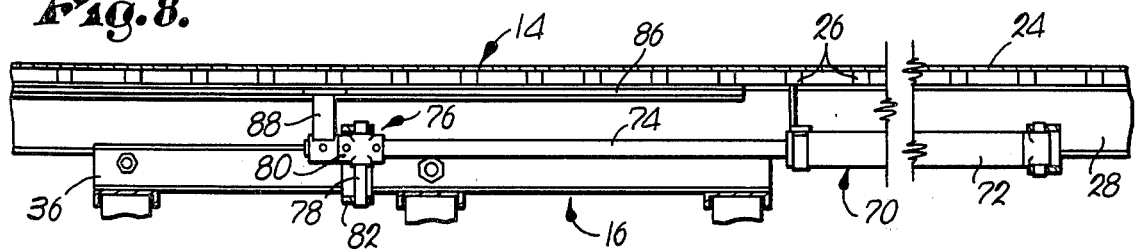
FIG. 8 is an enlarged, fragmentary, longitudinal cross-sectional view showing portions of the structure illustrated in FIG. 7.

As shown in FIGS. 8 and 9, apparatus in the form of hydraulic piston and cylinder assembly 70 is disposed between the bed 14 and the undercarriage 16 for effecting powered fore and aft movement of the latter relative to the bed 14. The assembly 70 has a cylinder end 72 mounted on the bed 14 and an opposed rod end 74 secured to the undercarriage 16 by a coupling 76. The coupling 76 includes an upright pin 78 rigidly mounted on the frame 36 of the undercarriage 16 and a sleeve 80 supported on the rod end 74 to captively receive the pin 78. Thus, the coupling 76 permits up and down reciprocation of the undercarriage 16 relative to the assembly 70. A stop 82 is provided on the end 78 for limiting the relative movement between the undercarriage 16 and the assembly 70.

As shown in FIG. 8, the end 74 is also shiftably supported on the bed 14 for sliding movement along the longitudinal axes of the latter by a guide 84 including a centrally disposed fore and aft extending raceway 86 on the bed 14 and a mating T-bar 88 rigidly carried on the rod end 74. In this manner, the cylinder aseembly 70 is at all times maintained in a parallel relationship to the bed 14.

Figure 2:
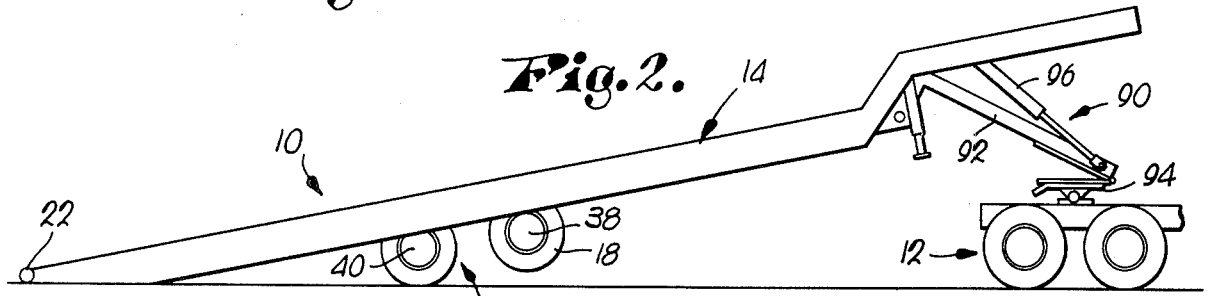
FIG. 2 is a side-elevation view of the trailer showing the bed shifted to its fully tilted position.

A lift mechanism 90 is coupled with the bed 14 adjacent the front end 20 for raising and lowering the latter and hence causing the bed 14 to tilt about the axle 40. As shown in FIG. 2, the mechanism 90 includes a tongue 92 pivotally mounted at one end to the bed 14 and secured at its opposite end to a fifth wheel 94 on the draft vehicle 12. An extensible hydraulic cylinder 96 extends between the bed 14 and the end of tongue 92 secured to the fifth wheel 94 such that extension and retraction of the cylinder 96 effects raising and lowering of the end 20 and in turn causes tilting of the bed 14 about the rear axle 40.

In operation, the trailer 10 is normally disposed in its roading position as shown for example in FIG. 1. When it is desired to load or unload the trailer 10, the bed 14 is tilted to a loading position as shown in FIG. 2 wherein the rear end 22 contacts the ground to present a smooth, gentle incline for movement of loads onto the bed 14.

In order to effect tilting of the bed 14 from its normal horizontal position to the inclined loading position, cylinder assembly 70 is retracted to move carriage 16 forwardly along the length of the bed 14 to the bed-tilting position shown in broken lines in FIG. 1. With the undercarriage 16 so positioned, the hydraulic cylinder 96 is extended causing the lift mechanism 90 to raise the front end 20 and hence, to effect tilting of the bed 14 about the axle 40 until rear end 22 comes in contact with the ground. The gradual incline presented by the tilted bed 14 is then utilized to quickly and easily move the desired load onto the bed 14. Typically, the load is in the nature of a self-propelled vehicle such that the load is simply driven to a desired position on the bed 14.

After the load has been properly positioned on the bed 14, the cylinder 96 is retracted causing lift mechanism 90 to lower the end 20 and consequently returning the bed 14 to its normal, substantially horizontal position. Next, the assembly 70 is actuated to cause the undercarriage 16 to move rearwardly relative to the bed 14. As the undercarriage 16 approaches the rear end of the path of travel relative to the bed 14, the rollers 46, 48, and 50 follow the inclines presented by ramps 60, 64 and 62 respecticely, such that the bed 14 is permitted to shift downwardly relative to the undercarriage 16 and the ground supporting the latter. This gravity induced, downward movement continues until the rollers 46, 48 and 50 contact their respective seats 66 whereupon the carriage 16 is precluded against further rearward movement and the bed 14 is in its lowermost position relative to the undercarriage 16. With the undercarriage 16 in this rearmost, roading position, the bed 14 presents an extremely low profile which enables transport of even tall loads on conventional roadways without fear of encountering overhead interference.

Of course, unloading of the bed 14 is accomplished in a manner similar to the above described loading operation.

From the foregoing, it can be seen that the present invention offers a solution to the problems incident to the transport of large agricultural vehicles and the like. In this connection, the instant invention offers a number of advantageous operating characteristics not heretofore available in a single machine. The unique cooperation between the roller assemblies 44 and the respective ramps 60,62 and 64 permits the bed 14 to assume a profile which is much lower to the ground than is now permitted in trailers having shiftable undercarriages. Moreover, by providing a shiftable undercarriage 16, the present invention also exhibits the desired characteristic of presenting a gradual loading ramp while at the same time permitting even load distribution. Hence, it is apparent that the instant invention offers significant advantages over transport trailers known in the art.

I claim:

1. A trailer including:
   an elongate bed having a normally horizontal roading position;
   a wheeled, bed-supporting undercarriage disposed adjacent the rear end of the bed therebelow when the bed is in said roading position,
   said undercarriage being shiftable relative to the bed from said roading position to a bed-tilting position intermediate the ends of the latter;
   apparatus interconnecting the bed and the undercarriage for shifting the latter;
   mechanism coupled with the bed for tilting the latter when the undercarriage is in said bed-tilting position; and
   structure for raising the bed to increase the distance between the latter and the undercarriage as the undercarriage is shifted from the roading position toward the bed-tilting position,
   said bed being provided with a deck having supporting understructure,
   parts of said understructure being at an elevation lower than the tops of the wheels of the undercarriage when the latter is in said roading position,
   said structure raising said parts to a wheel-clearing position,
   said understructure having a pair of laterally spaced, beams extending longitudinally of the bed, each provided with a tracking surface,
   said undercarriage having a roller assembly engaging said surfaces during shifting of the undercarriage,
   said structure including ramp means adjacent said rear end of the bed,
   said ramp means including a front and a rear ramp along tracking surface respectively,
   said roller assembly having a front and a rear roller for each ramp respectively.

2. The invention of claim 1:
   said ramp means including an intermediate ramp along each tracking surface respectively,
   said roller assembly including an intermediate roller for intermediate ramp.

3. The invention of claim 2:
   said forward and intermediate ramps each having a width narrower than the width of the corresponding surface, each forward ramp being disposed on one side of the longitudinal axis of the corresponding beam each intermediate ramp being disposed on the opposite side of said axis.
   each front roller being disposed on said one side for engaging its forward ramp, said intermediate roller being disposed on said other side for engaging its intermediate ramp,
   each rear ramp traversing the full width of its surface, each rear roller having a width greater than the width of the intermediate and forward ramps.

* * * * *